(12) United States Patent
Sick et al.

(10) Patent No.: US 10,983,037 B2
(45) Date of Patent: Apr. 20, 2021

(54) SYNTHETIC TURF TESTING APPARATUS

(71) Applicants: Polytex Sportbelage Produktions-GmbH, Grefrath (DE); Labosport International, Le Mans (FR)

(72) Inventors: Stephan Sick, Willich-Neersen (DE); Bernd Jansen, Nettetal (DE); Ivo Lohr, Kempen (DE); Dirk Sander, Kerken (DE); Pascal Haxaire, Vagney (FR); Loïc Dreau, Rouillon (FR); Roberto Armeni, Brivio (IT); Aurelien Le Blan, Le Mans (FR)

(73) Assignees: Polytex Sportbelage Produktions-GmbH, Grefrath (DE); Labosport International, Les Mans (FR)

(*) Notice: Subject to any disclaimer, the term of this patent is extended or adjusted under 35 U.S.C. 154(b) by 169 days.

(21) Appl. No.: 16/316,857

(22) PCT Filed: Jun. 29, 2017

(86) PCT No.: PCT/EP2017/066102
§ 371 (c)(1),
(2) Date: Jan. 10, 2019

(87) PCT Pub. No.: WO2018/010964
PCT Pub. Date: Jan. 18, 2018

(65) Prior Publication Data
US 2019/0302003 A1    Oct. 3, 2019

(30) Foreign Application Priority Data
Jul. 15, 2016    (EP) ..................... 16179799

(51) Int. Cl.
*G01N 3/56* (2006.01)
*G01N 19/02* (2006.01)

(52) U.S. Cl.
CPC ............ *G01N 3/56* (2013.01); *G01N 19/02* (2013.01); *G01N 2203/0025* (2013.01); *G01N 2203/0246* (2013.01)

(58) Field of Classification Search
CPC .. G01N 19/02; G01N 3/56; G01N 2203/0005; G01N 2203/0025;
(Continued)

(56) References Cited

U.S. PATENT DOCUMENTS

| 2004/0149005 A1 | 8/2004 | Hage et al. |
| 2006/0130556 A1 | 6/2006 | Olde Weghuis et al. |
| 2012/0297889 A1 | 11/2012 | Yngve |

FOREIGN PATENT DOCUMENTS

| CN | 1717580 A | 1/2006 |
| CN | 201307083 Y | 9/2009 |

(Continued)

OTHER PUBLICATIONS

Margaret Estivalet, Pierre Brisson: "The engineering of sport 7", vol. 2, Jan. 1, 2008, Springer Paris, paris, ISBN: 978-2-287-09413-2, article M. Sanchis, D. Rosa, J. Gámez, E. Alcántara, C. Gimeno, M. Such, J. Prat, R. Dejoz: "Development of a New Technique to Evaluate Abrasivieness Artificial Turf (p. 168)", pp. 149-156, XP008182875, DOI: 10.1007/978-2-287-09413-2_18.
(Continued)

*Primary Examiner* — Benjamin R Schmitt
(74) *Attorney, Agent, or Firm* — Harness, Dickey & Pierce, P.L.C.

(57) ABSTRACT

A synthetic turf testing apparatus includes a test element, wherein the test element has a contact surface for contacting a synthetic turf surface, wherein the test element includes a
(Continued)

temperature sensor for measuring a time dependent surface temperature of the contact surface; a pedestal attached to the test element, wherein the pedestal is configured for applying force to the test element; a carriage for translating the pedestal along a translational path; a guide structure for supporting the carriage and guiding the carriage along the translational path; and an actuator for moving the carriage relative to the guide structure.

22 Claims, 9 Drawing Sheets

(58) Field of Classification Search
CPC .. G01N 2203/0246; G01K 1/14; G01K 13/06; G01B 5/0023; G01B 5/28; G01M 99/007; G01D 5/02
USPC .................................................................. 73/7
See application file for complete search history.

(56) References Cited

FOREIGN PATENT DOCUMENTS

| CN | 204188506 U | 3/2015 |
|---|---|---|
| JP | S627039 U | 1/1987 |
| JP | H04117918 U | 10/1992 |
| JP | 2001020139 A | 1/2001 |
| JP | 2004526140 A | 8/2004 |
| WO | WO-02063279 A1 | 8/2002 |
| WO | WO-2009119795 A1 | 10/2009 |

OTHER PUBLICATIONS

R Verhelst et al: "International Conference on Latest Advances in High-Tech Textiles and Textile-Based Materials Temperature Development During Sliding on Different Types of Artificial Turf for Hockey", International Conference on Latest Advances in High-Tech Textiles and Textile-Based Materials, Proceedings, Sep. 25, 2009 (Sep. 25, 2009), Ghent, Belgium, pp. 90 99, XP055335220, ISBN: 978-90-81-39242-6, Retrieved from the Internet <URL:https://biblio.ugent.be/publication/767613/file/767615.pdf> [retrieved on Jan. 13, 2017].

Tay Sock Peng et al: "Insights to Skin-turf Friction as Investigated Using the Securisport", Procedia Engineering, Elsevier, Amsterdam, NL, vol. 112, Aug. 4, 2015 (Aug. 4, 2015), pp. 320-325, XP029250107, ISSN: 1877-7058, DOI: 10.1016/J.PROENG.2015. 07.252.

International Search Report PCT/ISA/210 for International Application No. PCT/EP2017/066102 dated Sep. 8, 2017.

Written Opinion of the International Searching Authority PCT/ISA/237 for International Application No. PCT/EP2017/066102 dated Sep. 8, 2017.

International Prelimiary Report on Patentability PCT/IPEA/416 for International Application No. PCT/EP2017/066102 dated Sep. 5, 2018.

Office Action dated Jan. 28, 2020, issued in corresponding Japanese Patent Application No. 2019-500674.

Office Action dated Feb. 26, 2020, issued in corresponding Korean Patent Application No. 10-2019-7000821.

G. Vincze et al., 'Generalization of the Thermal Dose of Hyperthermia in Oncology' *Open Journal of Biophysics*, vol. 5, 2015, pp. 97-114.

Chinese Office Action dated Dec. 28, 2020 for corresponding Chinese Application No. 201780042140.7, and English-language translation thereof.

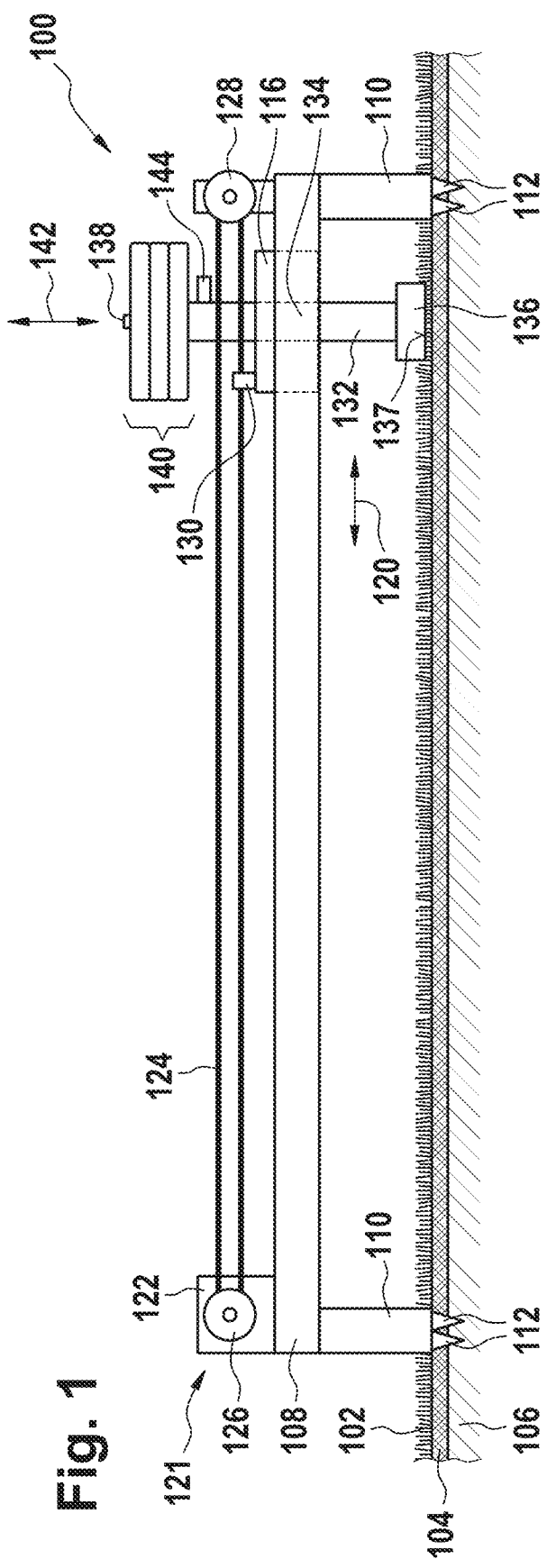
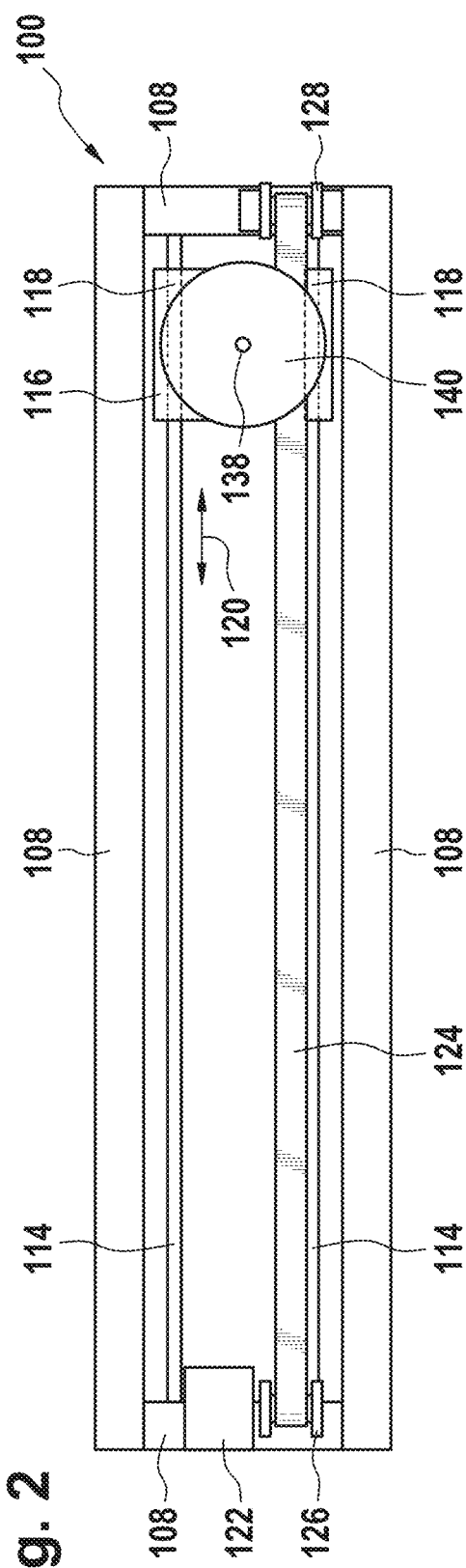

SYNTHETIC TURF TESTING APPARATUS

CROSS-REFERENCE TO RELATED APPLICATIONS

This application is a national phase under 35 U.S.C. § 371 of PCT International Application No. PCT/2017/066102 which has an International filing date of Jun. 29, 2017, which claims priority to European Application No. 16179799.8, filed Jul. 15, 2016, the entire contents of each of which are hereby incorporated by reference.

FIELD OF THE INVENTION

The invention relates to synthetic turf and the production of synthetic turf which is also referred to as artificial turf. In particular, the invention relates to the testing of the frictional properties of synthetic turf.

BACKGROUND AND RELATED ART

Synthetic turf or synthetic grass is surface that is made up of fibers which is used to replace grass. The structure of the synthetic turf is designed such that the synthetic turf has an appearance which resembles grass. Typically synthetic turf is used as a surface for sports such as soccer, American football, rugby, tennis, golf, for playing fields, or exercise fields. Furthermore synthetic turf is frequently used for landscaping applications.

An advantage of using synthetic turf is that it eliminates the need to care for a grass playing or landscaping surface, like regular mowing, scarifying, fertilizing and watering. Watering can be e.g. difficult due to regional restrictions for water usage. In other climatic zones the re-growing of grass and re-formation of a closed grass cover is slow compared to the damaging of the natural grass surface by playing and/or exercising on the field. Synthetic turf fields though they do not require a similar attention and effort to be maintained, may require some maintenance such as having to be cleaned from dirt and debris and having to be brushed regularly. This may be done to help fibers stand-up after being stepped down during the play or exercise. Throughout the typical usage time of 5-15 years it may be beneficial if an synthetic turf sports field can withstand high mechanical wear, can resist UV, can withstand thermal cycling or thermal ageing, can resist inter-actions with chemicals and various environmental conditions. It is therefore beneficial if the synthetic turf has a long usable life, is durable, and keeps its playing and surface characteristics as well as appearance throughout its usage time.

A concern when using synthetic turf is its effect on skin when an athlete slides. Sliding by the athlete can be intentional or controlled and may be to perform various athletic maneuvers such as a sliding tackle. Sliding may also be unintentional or accidental. The synthetic turf surface can abrade the skin. Friction between the synthetic turf surface and the skin can also lead to heating which may result in an injury.

United States patent application publication US 2006/0130556 A1 discloses a device for measuring the static and/or dynamic friction coefficient of a natural or synthetic grass surface. A rotatable shaft which is vertically disposed in a housing brings a rotating body into contact with a contact surface. A measuring means measures torque caused by friction between the contact surface and the rotating body.

United States patent application publication US 2004/0149005 discloses a device for measuring the static and/or dynamic friction coefficient of a natural or synthetic grass surface, in which the device comprises a frame to which a first arm is pivotally connected with one side, which first arm is pivotally connected at its other side to a bar fitted with a body having a surface which can be placed into contact with the surface to be measured, wherein said bar is furthermore connected to a means for exerting thereon a torque which acts about the pivot point thereon, and wherein loading means are furthermore present for exerting a force on the bar in the direction of the surface to be measured, wherein the bar is furthermore provided with means for measuring forces occurring in the bar, which means are present at a point located between the pivot point with the first arm and the side which is capable of carrying said body.

SUMMARY

The invention provides for a synthetic turf testing apparatus and a method in the independent claims. Embodiments are given in the dependent claims.

In one aspect the invention provides for a synthetic turf testing apparatus. The synthetic turf testing apparatus comprises a test element. The test element has a contact surface for contacting a synthetic turf surface. The test element comprises a temperature sensor mounted flush with the contact surface for measuring a time-dependent surface temperature of the contact surface. The synthetic turf testing apparatus further comprises a pedestal attached to the test element. The pedestal is configured for applying force to the test element. The synthetic turf testing apparatus further comprises a carriage for translating or moving the pedestal along a translational path. A carriage as used herein encompasses a mechanical component that moves in a predetermined path (referred to as "the translational path" in this example) and carries or guides another mechanical component. The carriage may also be referred to as a guide carriage or a trolley.

The synthetic turf testing apparatus further comprises a guide structure for supporting the carriage and guiding the carriage along the translational path. The synthetic turf testing apparatus further comprises an actuator for moving the carriage relative to the guide structure. In other words, the actuator is for actuating the carriage along the translational path relative to the guide structure.

This embodiment may be beneficial because it may provide for an effective means of measuring the surface temperature of the contact surface as it is trying to cross an synthetic turf surface along the translational path. This may provide for an effective means of testing a variety of synthetic turfs. Measuring the surface temperature may be beneficial in estimating the amount of injury that a player would receive when falling and/or sliding on the synthetic turf.

The use of the translational path may be beneficial for several reasons. Firstly as the test element is dragged over the surface of the synthetic turf it may disturb the structure of the synthetic turf. For example infill which is dispersed between the fibers of the synthetic turf may be displaced. If a circular or overlapping path is used, the temperature data measured may be erroneous because at least some of the infill is displaced. The translational path my therefore provide for more accurate temperature and/or wear measurements in comparison to a circular or overlapping path.

The translational path may also be superior to a circular or overlapping path because the test element could also heat the synthetic grass as it is dragged. If the temperature of the synthetic turf is elevated, then the temperature and/or wear measurements could be erroneous.

In another embodiment, the translational path is a linear path.

In another embodiment, the translational path comprises a curve within it.

In another embodiment, the translational path is non-circular.

In another embodiment, the translational path is non-overlapping.

In another embodiment, the test element is able to be moved along a movement axis relative to the carriage. The motion axis may be in a vertical direction when the synthetic turf testing apparatus is in an operating position. For example the pedestal may move in a vertical direction and be used to bring the test element into contact with the surface of the synthetic turf.

In another embodiment, the synthetic turf testing apparatus comprises the synthetic turf to be tested.

In the invention, the temperature sensor is mounted flush with the contact surface. The contact surface may have a flat portion and the temperature sensor is arranged mechanically so that it is level with this flat portion.

In another embodiment, the temperature sensor comprises a planar surface. In this embodiment; the planar surface is arranged so that it is flush with the flat portion of the contact surface.

In another embodiment, the temperature sensor and the contact surface form a sliding surface. The sliding surface may be configured for sliding when the contact surface is placed on the synthetic turf. The sensor and the contact surface form a sliding surface when they are at the same level or flush with each other so that one of the contact surface and the temperature sensor does not contact the synthetic turf at a different height or level than the other.

In another embodiment, the pedestal comprises a weight holder for receiving weights. The pedestal is configured for transmitting force generated by the weights to the contact surface. For example the pedestal could be constructed such that it moves relative to the carriage so that weight placed on the weight holder has its force directly transferred to the contact surface. This may have the benefit of enabling the realistic simulation of the weight of a player who is falling or sliding on a synthetic turf.

In another embodiment, the weight holder is configured for receiving standard weight lifting or fitness studio weights or weight plates.

In another embodiment, the synthetic turf testing apparatus comprises the weights.

In another embodiment, the weights have a combined mass of any one of the following: at least 30 kg, at least 40 kg, at least 45 kg, at least 50 kg, at least 55 kg, at least 65 kg, at least 70 kg, at least 75 kg, at least 80 kg, and at least 85 kg.

In another embodiment, the weights have a combined mass of any one of the following: less than or equal to 45 kg, less than or equal to 60 kg, less than or equal to 75 kg, less than or equal to 90 kg, less than or equal to 105 kg, and less than or equal to 120 kg. These maximal weights may be combined with the previously mentioned minimum weights as long as the combination is not mutually exclusive.

In another embodiment, the synthetic turf testing apparatus further comprises a controller.

In another embodiment, the controller is configured for recording the time-dependent surface temperature. In different embodiments, the controller may take different forms. In one example the controller may be integrated into the pedestal, the carriage, and/or the guide structure. In other embodiments the controller is at least partially comprised by a handheld telecommunications device. This may for example be such devices as a smart phone or a tablet. For example the controller may be at least partially comprised by a device that communicates with the rest of the synthetic turf testing apparatus via a wireless telecommunications network or connection.

In another embodiment, the controller is configured for controlling the actuator.

In another embodiment, the controller is configured for controlling the actuator to control the actuator to move the carriage according to a predetermined velocity or a position profile. For example the actuator can be controlled such that the carriage is moved such that it has a particular position and/or velocity as a function of time. This may be beneficial in simulating various types of sliding actions either intention or unintentional by a player.

In another embodiment, the controller is configured for controlling the actuator to accelerate to a predetermined release velocity. For example, the controller may be programmed such that the actuator is used to accelerate the carriages as rapidly as possible to a particular release velocity.

In another embodiment, the controller is configured for controlling the actuator to move freely after the release velocity is achieved. For example it may be desired to simulate the effect of a player sliding on a turf. Instead of driving the carriage during the period of sliding it may be possible to simulate a slide by making it so the actuator neither accelerates nor decelerates the carriage. Any deceleration of the carriage and the test element then occurs due to friction of the test element with the synthetic turf surface. In some examples the synthetic turf testing apparatus may also contain a sensor or may take measurements from the actuator to determine the position of the carriage as a function of time. This may be stored in meta data or prepared in results so that the sliding of the test element as a function of the release velocity can be recorded and possibly studied later.

In another embodiment, the pedestal is configured for freely moving along a movement axis relative to the carriage. For instance, there may be a linear or other type of bearing that enables the pedestal to move freely in the direction of the movement axis. For example, when the synthetic turf testing apparatus is in an operating position the movement axis may be aligned in a substantially vertical direction. The carriage further comprises a controllable restraint configured for releasably fixing the pedestal relative to the carriage such that the test element is suspended above the synthetic turf surface. The controller is configured for controlling the controllable restraint to release the pedestal according to any one of the following criteria: it is released when the carriage is in a predetermined location, it is released at a predetermined time during the experiment, and it is released when the carriage reaches a predetermined drop velocity. This embodiment may be beneficial because it may be useful for simulating the impulse that occurs when a player begins to slide on the synthetic turf surface.

In some examples, the pedestal may be moved into a variety of different positions which represent different heights above the synthetic turf surface. This may be useful in being able to test various impulses when the player begins to slide on the synthetic turf surface.

In another embodiment, the pedestal further comprises a force sensor for measuring an impulse after the controllable restraint is released. For example the force sensor might be a three-dimensional force sensor. The inclusion of a force sensor may be beneficial because it may enable an empirical determination of the impulse when the pedestal drops the test element onto the synthetic turf surface. The measured impulse data could also be stored with other meta data or data descriptive of experiments run with the synthetic turf testing apparatus. Measurement of the impulse may be beneficial because the operator can adjust the height that the test element is dropped from and also the weight applied to the pedestal may be adjusted so that a desired impulse is obtained.

In another embodiment, the predetermined drop velocity is identical with the release velocity.

In another embodiment, the handheld telecommunications device has an app or application which implements a control and/or testing program for the synthetic turf testing apparatus. In one example, it may be used to control the operation and function of the synthetic turf testing apparatus. In other examples, it may be used to perform analysis of the time-dependent surface temperature.

In another embodiment, the controller comprises a handheld telecommunications device.

In another embodiment, the controller is configured for calculating any one of the following from the time-dependent surface temperature: a maximum temperature, an average temperature, a thermal dose, and combinations thereof. This embodiment may be beneficial because the various temperature statistics derived from the time-dependent surface temperature may be useful in evaluating the synthetic turf. The maximum temperature and/or the average temperature may in some cases be an accurate estimate of the amount of damage to the skin. The thermal dose may be dependent upon the temperature and the duration that an elevated temperature is applied to tissue.

This may be useful in for instance during testing to optimize the safety of a synthetic turf carpet. The concept of the thermal dose is used in medical situations and in particular in the use of hyperthermia in oncology for treating or destroying cancerous tissue. The same concept may be applied in a different field to estimating the effect of elevated heating due to falling on synthetic turf. A thermal dose may be calculated according to any one of the standard methods of calculating a thermal dose such as is illustrated in the review article Vincze, G., Szasz, O. and Szasz, A. (2015) Generalization of the Thermal Dose of Hyperthermia in Oncology. Open Journal of Biophysics, 5, 97-114. doi: 10.4236/ojbiphy.2015.54009.

In another embodiment, the controller is configured for receiving a set of test parameters. The controller is further configured for controlling the actuator using the test parameters. The test parameters may for instance be commands or details which describe how fast the actuator should be moved and also the distance the actuator should be moved. The test parameters may be commands for controlling the actuator or they may be data which may be translated into commands for controlling the actuator.

In another embodiment, the test parameters comprise metadata descriptive of the synthetic turf conditions. These for instance may include details about the type of synthetic turf fibers used or even the trade or trademark name for a particular synthetic turf. When a player impacts an synthetic turf surface it is not only the fibers which affect how the skin of the player will react with the synthetic turf. It may also be dependent upon any cushioning or filling material below the synthetic turf carpet such as rubber or sand. Also, when synthetic turf is installed normally an infill material is used also. The infill material may be a granular material such as rubber granulate or even sand, which is used to provide the synthetic turf with a more realistic and elastic feeling. The particular choice of synthetic turf infill may affect the time-dependent temperature when the test element is dragged across the surface of the synthetic turf.

In another embodiment, the controller is configured for generating a test report comprising any one of the following: the time-dependent surface temperature, the test parameters, the metadata, and combinations thereof.

In another embodiment, the controller is further configured to generate a signature for the test report using a private key of a public key cryptographic algorithm. This embodiment may be beneficial because the test report can be generated by a tester or testing group and then signed so that the authenticity of the test report can be verified at a later time. This for instance may be useful for such things as using the test report as an archive of test results. It may also be useful in legal situations where the test report can show diligence in testing particular synthetic turfs.

The private key for instance could be located within the various components of the synthetic turf testing apparatus. In some instances the controller may be located on a portable handheld computing device such as a mobile telephone device or the controller with the private key may also be located within the pedestal, carriage, or guide structure.

In another embodiment, the guide structure comprises legs for supporting the guide structure on the synthetic turf.

In another embodiment, the legs comprise protrusions for gripping the synthetic turf. These for instance may be spikes or may be even shaped similarly to studs on shoes which are used for synthetic turf. This may have the benefit of helping also to hold the synthetic turf in place as the synthetic turf testing apparatus is used.

In another embodiment, the pedestal is restricted to move along a vertical axis.

In another embodiment, the contact surface is formed by any one of the following: plastic, a polymer, metal, polytetrafluoroethylene, and combinations thereof.

In another embodiment, the actuator comprises any one of the following: a motor, a pneumatic system, and a hydraulic system.

In another embodiment, the actuator comprises a belt or a chain for actuating the carriage.

In another embodiment, the actuator is configured for moving the carriage at a peak velocity of at least 1 m/s.

In another embodiment, the actuator is configured for moving the carriage at a peak velocity of at least 2 m/s.

In another embodiment, the actuator is configured for moving the carriage at a peak velocity of at least 3 m/s.

In another embodiment, the actuator is configured for moving the carriage at a peak velocity of at least 4 m/s.

In another embodiment, the actuator is configured for moving the carriage at a peak velocity of at least 5 m/s.

In another embodiment, the actuator is configured for moving the carriage at a peak velocity of at least 6 m/s.

In another embodiment, the surface temperature sensor is a surface thermocouple. This may be beneficial because the surface thermocouple is easy and straight forward to use for testing the surface temperature.

A surface thermocouple as used herein encompasses a thermocouple sensor that incorporates a planar surface. The surface thermocouple measures the temperature of the planar surface. The planar surface may for example be made from a metal.

In another embodiment, the synthetic turf testing apparatus has a contact surface where the contact surface has a flat portion.

In another embodiment, the contact surface has rounded edges. This may be beneficial so that the test element is able to be slid across the synthetic turf without it binding.

In another embodiment, the contact surface is configured for receiving an abrasion test surface that covers the contact surface.

In the invention, the surface temperature is measured using the temperature sensor. In embodiments an abrasion test surface is attached to the contact surface. In this test the weight of the contact surface can be measured both before and after use. This may be used to estimate the amount of material that would be removed from a person or other object when it is slid across the synthetic turf.

In another embodiment, the synthetic turf testing apparatus comprises the abrasion test surface.

In another embodiment, the abrasion test surface is any one of the following: leather, a vinyl cloth, collagen fibers that are formed into a mat or covering, and polyurethane synthetic leather.

The invention provides for a method of testing synthetic turf with an apparatus according to any one of the appended claims 1 to 16. The method comprises placing the synthetic turf testing apparatus such that the contact surface is able to be or is operable to contact the synthetic turf along the translational path. In some examples, when in an operating position gravity may cause the test element to contact the synthetic turf. In this case the method may comprise placing the synthetic turf testing apparatus such that the contact surface is in contact with the synthetic turf along the translational path.

In other cases the pedestal may be restrained by a controllable restraint that holds the vertical position of pedestal fixed relative to the carriage. In this case the method step may be placing the synthetic turf testing apparatus such that the contact surface is suspended above the synthetic turf along the translational path.

The method further comprises controlling the actuator to move the carriage along the translational path.

The method further comprises repeatedly recording the time-dependent temperature as the carriage moves along the translational path.

In another embodiment, the method further comprises generating a test report using the time-dependent temperature. The pedestal or the carriage comprises a transmitter. The method further comprises transmitting the test report to a handheld telecommunications device using the transmitter. The handheld telecommunications device may for instance then be used to generate a test report or other analysis of the time-dependent temperature.

In another embodiment, the method further comprises calculating any one of the following from the time-dependent surface temperature: a maximum temperature, an average temperature, a thermal dose, and combinations thereof.

In another embodiment, the synthetic turf apparatus is according to an embodiment where the contact surface is configured for receiving an abrasion test surface that covers the contact surface. The method further comprises attaching the abrasion test surface to the contact surface before placing the synthetic turf testing apparatus in contact with the synthetic turf. The method further comprises acquiring a post-abrasion three-dimensional image of the abrasion test surface with the three-dimensional imaging system after repeatedly recording the time-dependent temperature as the carriage moves along the translational path.

The method further comprises calculating surface wear statistics at least partially using the post-abrasion three-dimensional image. This embodiment may be beneficial because the use of the three-dimensional image can be used to calculate the change or the relative change in the height of the abrasion test surface. This may allow direct calculations of various statistics.

In another embodiment, the method further comprises acquiring an initial three-dimensional image of the abrasion test surface with the three-dimensional imaging system before attaching the abrasion test surface to the contact surface. The wear statistics are calculated using a comparison between the post-abrasion three-dimensional image and the initial three-dimensional image. This embodiment may be beneficial because the before and after images may allow more accurate determination of the surface wear and the statistics. In some examples there may be reference marks or indicators or fiduciary marks on the surface of the abrasion test surface so that the post-abrasion three-dimensional image and the initial three-dimensional image can be more accurately aligned.

In another embodiment, the pedestal applies at least 30 kg to the contact surface.

In another embodiment, the pedestal applies at least 40 kg to the contact surface.

In another embodiment, the pedestal applies at least 45 kg to the contact surface.

In another embodiment, the pedestal applies at least 50 kg to the contact surface.

In another embodiment, the pedestal applies at least 55 kg to the contact surface.

In another embodiment, the pedestal applies at least 60 kg to the contact surface.

In another embodiment, the pedestal applies at least 65 kg to the contact surface.

In another embodiment, the pedestal applies at least 70 kg to the contact surface.

In another embodiment, the pedestal applies at least 75 kg to the contact surface.

In another embodiment, the pedestal applies at least 85 kg to the contact surface.

It is understood that one or more of the aforementioned embodiments of the invention may be combined as long as the combined embodiments are not mutually exclusive.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage may be any volatile or non-volatile computer-readable storage medium.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the C programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It is understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

BRIEF DESCRIPTION OF THE DRAWINGS

In the following embodiments of the invention are explained in greater detail, by way of example only, making reference to the drawings in which:

FIG. 1 illustrates a side view of an synthetic turf testing apparatus;

FIG. 2 shows a top view of the synthetic turf testing apparatus of FIG. 1;

DETAILED DESCRIPTION

Figure 3:
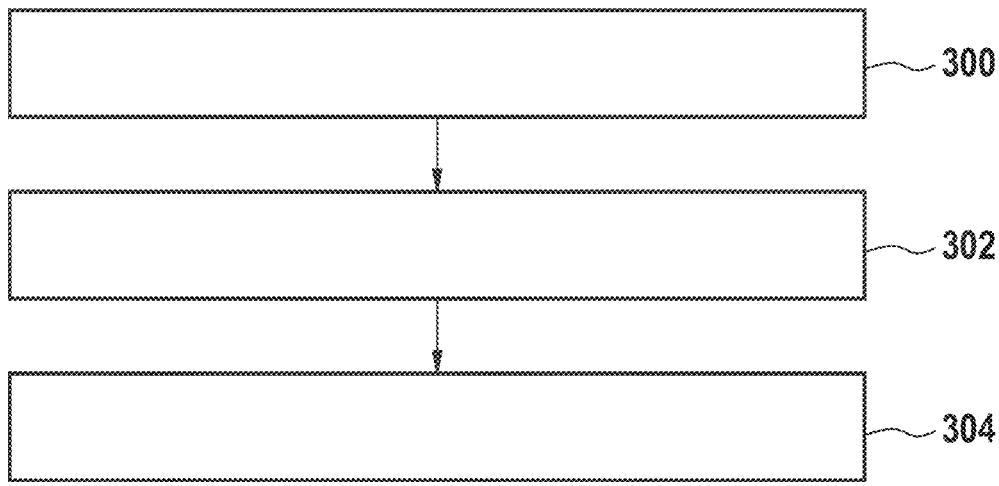
FIG. 3 shows a method of operating the synthetic turf testing apparatus of FIG. 1.

Like numbered elements in these figures are either equivalent elements or perform the same function. Elements which have been discussed previously will not necessarily be discussed in later figures if the function is equivalent.

FIG. 1 shows an example of an synthetic turf testing apparatus. The synthetic turf testing apparatus 100 has been placed onto an synthetic turf carpet 102. The synthetic turf carpet 102 is placed upon base material 104. The base material 104 is on top of ground 106 or earth. The synthetic turf carpet 102 could for instance be a tufted synthetic turf carpet. The base material 104 may be material which is used to smooth the surface upon which the synthetic turf carpet 102 is laid or it may also have material such as rubber granulates which are at least partially elastic. The synthetic turf testing apparatus 100 comprises a frame 108. Attached to the frame 108 are legs 110 that support the synthetic turf testing apparatus 100. The legs 110 are shown as having optional protrusions 112. These protrusions may stick at least partially into the synthetic turf carpet 102 to help to hold the synthetic turf testing apparatus 100 in the proper position.

FIG. 1 shows a side view of the synthetic turf testing apparatus 100 and FIG. 2 shows a top view of the synthetic turf testing apparatus. Visible in the top view are two parallel rods 114 which function as a guide structure for a carriage 116. The carriage 116 contains linear bearings 118 which allow the carriage 116 to move along the parallel rods 114. This forms a translational path 120. The parallel rods 114 in this example are only intended to serve as an example of one possible guiding structure. The guiding structure could be constructed in alternative ways such as using a track or other guide system for forcing the carriage 116 to follow a defined path 120. If a track were used the translational path could contain one or more curves.

The synthetic turf testing apparatus 100 has an actuator 121 for moving the carriage 116 relative to the guide structure 114. The actuator 121 comprises a motor 122 that is used to drive a belt 124. Attached to the motor 122 is a driving pulley 126. There is then a driven pulley 128 on the opposing side of the frame 108. As the motor 122 spins it causes the belt 124 to move. There is an attachment point 130 where the belt 124 is attached to the carriage 116. As the motor 122 spins the driven pulley 126 the belt 124 is moved and the carriage 116 is moved along the translational path 120. The example shown in FIGS. 1 and 2 is only one way of implementing an actuator. Other systems such as a cable drive, a chain, or the use of hydraulic and pneumatic systems could also be envisioned. The example shown in FIGS. 1 and 2 however, is extremely portable and may be used in the field. If large hydraulic or pneumatic systems are used it may be more difficult to move the synthetic turf testing apparatus 100 to different locations. The use of the belt drive also enables the carriage 116 to be moved in both directions along the translational path 120.

The synthetic turf testing apparatus is further shown as comprising a pedestal 132. The pedestal is inserted through a linear bearing 134 that goes through the carriage 116. At the base of the pedestal 132 is a test element 136 with a contact surface 137. The contact surface 137 is in contact with the synthetic turf carpet 102. As the carriage 116 is moved along the translational path 120 the test element 136 is dragged across the synthetic turf carpet 102. This causes friction between the synthetic turf carpet 102 and the contact surface 137, which will generate heat. Not shown in FIGS. 1 and 2 is a temperature sensor that measures the temperature of the contact surface 137. There is further shown an instrument electronics 144 which may for instance provide such things as electronics and power for powering the temperature sensor. In some examples instrument electronics 144 may also contain a controller or a portion of a controller. On the top of the pedestal 132 is a weight or mass holder 138. In this case the weight holder 138 is in the form of a spindle. The spindle 138 is able to receive weights 140. In this example the weights are standard weight lifting weight plates. The use of the weight holder 138 enables standard weights which may be found at nearly any fitness club or weight lifting gym to be used to control the amount of force which is applied by the pedestal 132 to the contact surface 137. By placing a different number of weight plates 140 on the weight holder 138 a tester can simulate the weight of different sized athletes as they fall and skid on the synthetic turf carpet 102.

The linear bearing 134 causes the pedestal 132 to move along a direction 142. In this case the direction 142 is essentially vertical with respect to the ground 106. The direction 142 may therefore be interpreted as being vertical when the synthetic turf testing apparatus 100 is in an operating position. The use of the pedestal 132 and the linear bearing 134 with the weight plates 140 enables the synthetic turf testing apparatus to put a controlled force on the contact surface 137 even when the position of the synthetic turf carpet 102 is uneven or even changes over the distance of the translational path 120. This could for example enable the testing of an synthetic turf carpet 102 that has been installed for a number of years and is in less than ideal or even condition.

The legs 110 and/or frame 108 may also optionally have a flat material such as clear plastic attached to them to function as a shield to prevent operators from being injured by the carriage, pedestal, belt drive 124, or the test element 136.

FIG. 3 shows a flowchart which illustrates a method of using the synthetic turf testing apparatus 100 depicted in FIGS. 1 and 2. First in step 300 the synthetic turf testing apparatus 100 is placed such that the contact surface 137 is in contact with synthetic turf 102 along the translational path 120. Next in step 302 the actuator 121 moves the carriage 116 along the translational path 120. Finally in step 304 the method comprises repeatedly recording the time-dependent temperature as the carriage 116 moves along the translational path.

Figure 4:
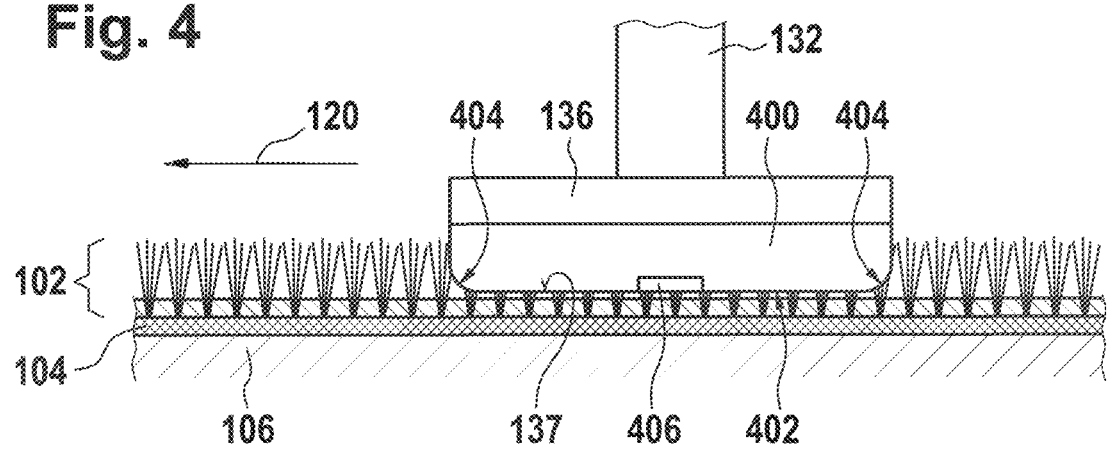
FIG. 4 shows a view of a test element in contact with an synthetic turf carpet.

FIG. 4 shows a detailed view of the test element 136. The test element 136 is shown as being attached to the pedestal 132. In this particular example the test element 136 comprises a polytetrafluoroethylene block. The polytetrafluoroethylene block 400 has a flat surface 402 with curved edges 404. The curved edges 404 enable the block 400 to be more easily dragged across the synthetic turf carpet 102. As the block 400 is dragged along the translational path 120 over the synthetic turf carpet 102 fibers of the carpet abrade the contact surface 137 warming it. There is a temperature sensor 406 that is mounted flush with the contact surface 137. This enables measurement of a surface temperature of the contact surface 137. In this particular example the temperature sensor 406 is a surface thermocouple that is mounted flush with the contact surface 137. The view in FIG. 4 is a cross-sectional view.

Figure 5:
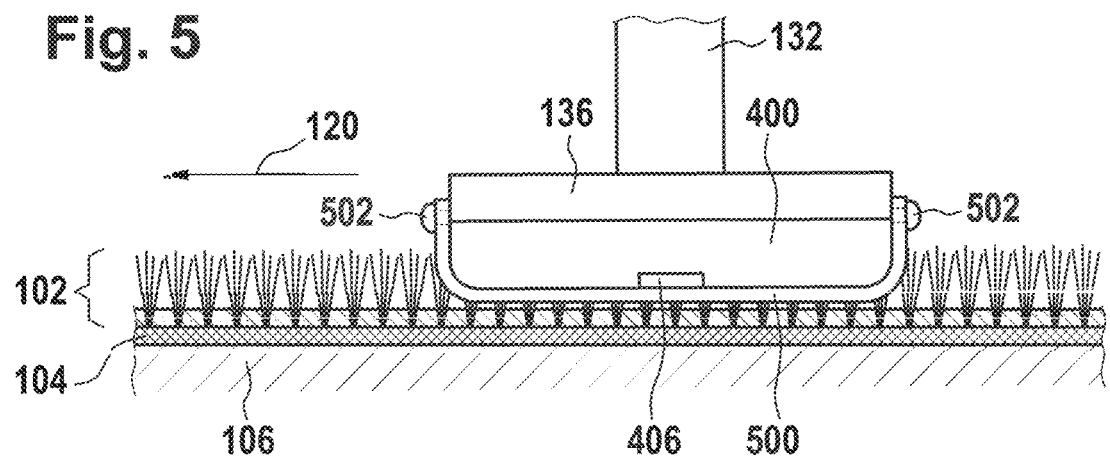
FIG. 5 shows a view of an alternative test element in contact with an synthetic turf carpet.

FIG. 5 shows a further example of the test element 136. The test element 136 depicted in FIG. 5 is identical with that of FIG. 4 except that an abrasion test surface 500 has been placed over the surface of the polytetrafluoroethylene block 400. It may for example be fastened with a number of fasteners 502. In this instance the synthetic turf testing apparatus is instead used to test the abrasiveness of the synthetic turf carpet 102. The abrasion test surface 500 can be applied to the test element 136 and then the surface in contact with the turf is on the outside of the abrasion test surface 500. As the test element 136 is moved along the translational path 120 the synthetic turf carpet 102 will abrade and wear away a part of the abrasion test surface 500. The abrasion test surface 500 can be weighed before it is applied to the test element 136 and then again after the test element 136 has been moved along the translational path 120 one or more times.

Figure 6:
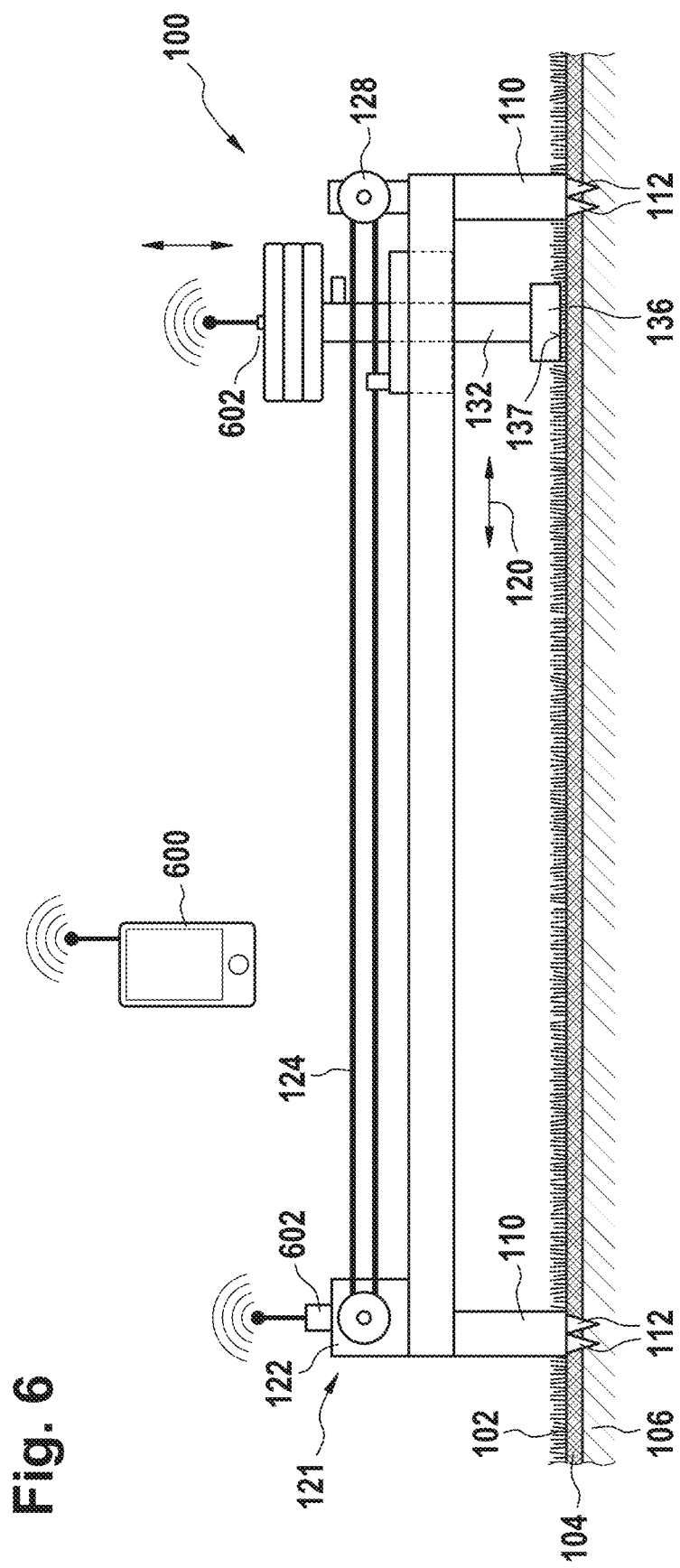
FIG. 6 illustrates a further example of an synthetic turf testing apparatus.

FIG. 6 shows a modification of the synthetic turf testing apparatus 100. In this example the synthetic turf testing apparatus further comprises a handheld telecommunications device 600 such as a tablet, laptop or smartphone. The motor 122 and the pedestal 132 are further shown as containing wireless control elements 602. The wireless control elements 602 are able to communicate with the handheld telecommunications device 600 via a wireless communication link. The wireless communication link could for example be a WiFi connection, a Bluetooth, or other form of radio communication. The handheld telecommunications device 600 can function as a data logger for recording data and/or for controlling the operation and function of the synthetic turf testing apparatus 100.

Figure 7:
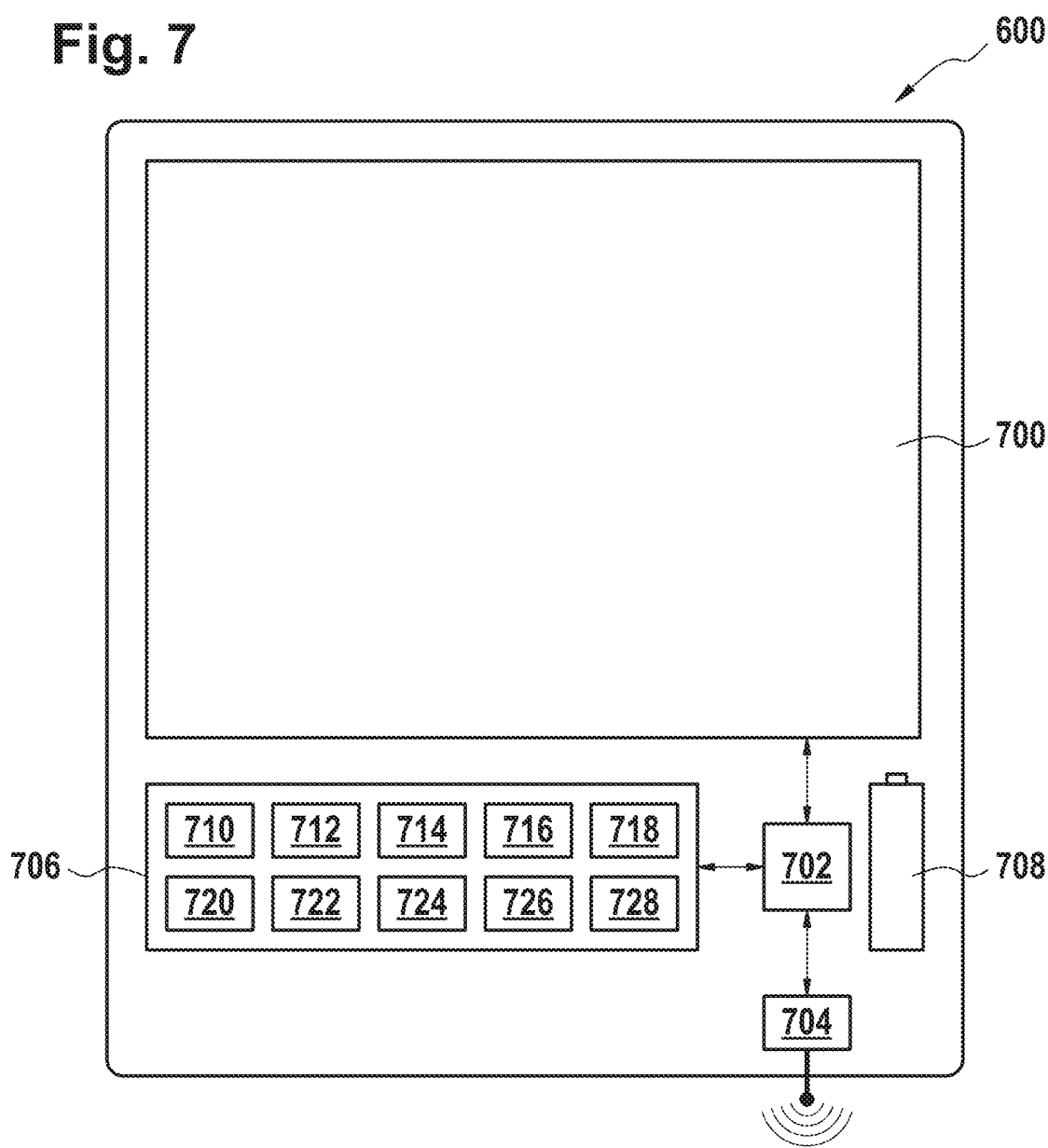
FIG. 7 illustrates an example of a hand held telecommunications device.

FIG. 7 shows the handheld telecommunications device 600 in greater detail. The handheld telecommunications device 600 comprises a touch screen 700 that is in connection with a processor 702. The processor 702 is also connected to a wireless telecommunication system 704 and a memory 706. The handheld telecommunications device 600 is powered by a battery 708.

The memory 706 is shown as containing machine-executable instructions 710 that enable the processor 702 to communicate with the rest of the synthetic turf testing apparatus 100 via the wireless communication system 704. The memory 706 is further shown as containing test parameters 712 which are descriptive of a test to be performed by controlling the motor 122 and measuring the time-dependent surface temperature. This may for instance include different velocity profiles to simulate different types of falls or accidents by athletes. The memory 706 is further shown as containing time-dependent temperature data 714 that was measured in response to performing an experiment using the test parameters 712. The computer memory 706 is shown as optionally containing temperature statistics 716. These may include statistics which may be the average mean or other statistical quantity calculated from the time-dependent temperature data 714.

The computer memory 706 is further shown as optionally containing a thermal dose 718 that was calculated from the time-dependent temperature data 714. The computer memory 706 is shown as further containing metadata 720 which is descriptive of the test conditions. This for instance may contain data descriptive of the pile or the type of synthetic turf carpet and may also contain data descriptive of the base material or infill material used with the particular synthetic turf carpet 102. The computer memory 706 is further shown as containing a private key 722 which may be used for generating signatures. The computer memory 706 is further shown as containing a test report 724 which may contain optionally the test parameters, the time-dependent temperature data, the temperature statistics, and/or the thermal dose. The computer memory 706 further shows a signature 726 of the test report 724 that has been generated using the private key 722. This may be used to authenticate the authenticity of the test report 724 at a later date. The computer memory 706 is also shown as containing a test database 728 of prior test reports 724 that have been measured. The test database 728 may also be located on a remote server which the handheld telecommunications device 600 may communicate with automatically after generating the test report 724 and optionally the signature 726.

Figure 8:
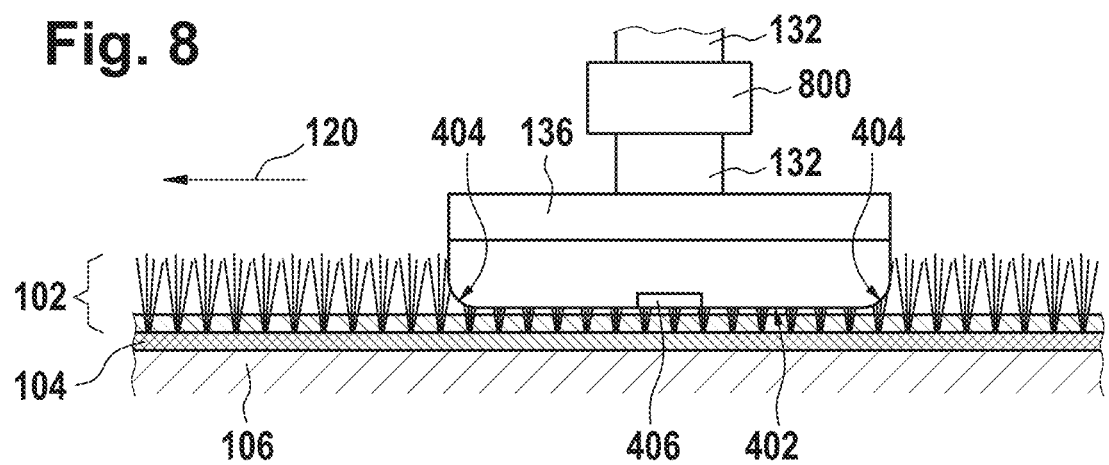
FIG. 8 illustrates a further example of an synthetic turf testing apparatus.

In FIG. 8 the force sensor 800 is shown as extending beyond the boundaries of the pedestal 132. This is to emphasize the location of the force sensor 800. However, it is likely that in many embodiments the force sensor 800 may be positioned such that it does not interfere with the free movement of the pedestal 132 in the linear bearing 134.

Figure 9:
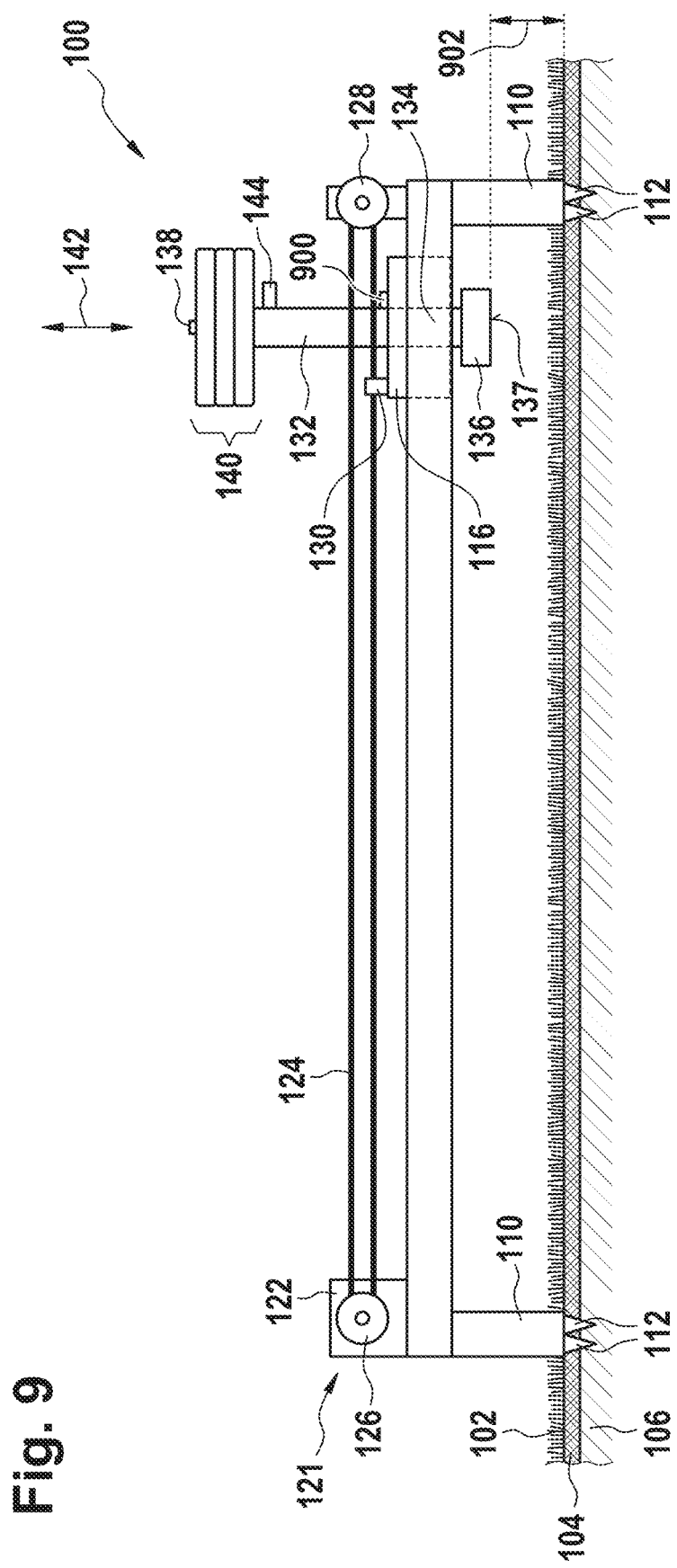
FIG. 9 shows a further view of the synthetic turf testing apparatus of FIG. 8.

FIG. 9 shows a further example of an synthetic turf testing apparatus 100. It is similar to the examples illustrated in FIGS. 1, 2, 6 and 7. The features of any of these other examples may be included in the example illustrated in FIG. 9. FIG. 9 includes the additional feature of a controllable restraint 900. The controllable restraint 900 is used to lock the pedestal 132 in a position relative to the carriage 116. This holds the pedestal 132 in place such that the test element 136 is held at a height 902 above the synthetic turf 102. The controller such as the handheld telecommunications device 600 can control the controllable restraint 900 to drop the pedestal 132 which then causes the test element 136 to impact the synthetic turf 102. This may be used to simulate impulses when a player slides on the synthetic turf 102.

Figure 10:
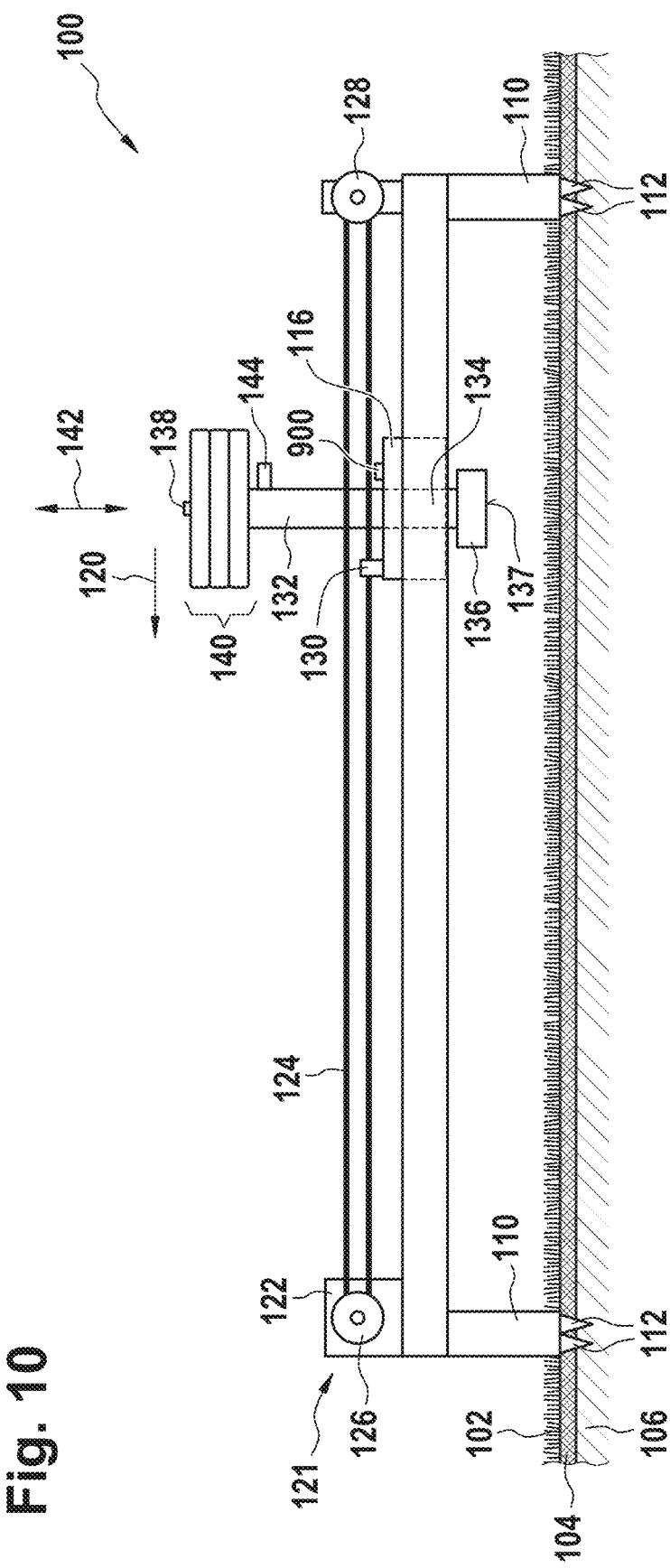
FIG. 10 shows a further view of the synthetic turf testing apparatus of FIG. 8.

FIG. 10 shows the synthetic turf testing apparatus 100 of FIG. 9 after the actuator 121 has moved and accelerated the carriage 116. The controllable restraint 900 has been moved back and the pedestal 132 begins a freefall such that the test element 136 will impact the synthetic turf 102. The controllable restraint 900 could be controlled such that the restraint is released at a particular time, a particular position, or a particular velocity. The test element 136 has a velocity in the direction 120 and also in the direction 142.

Figure 11:
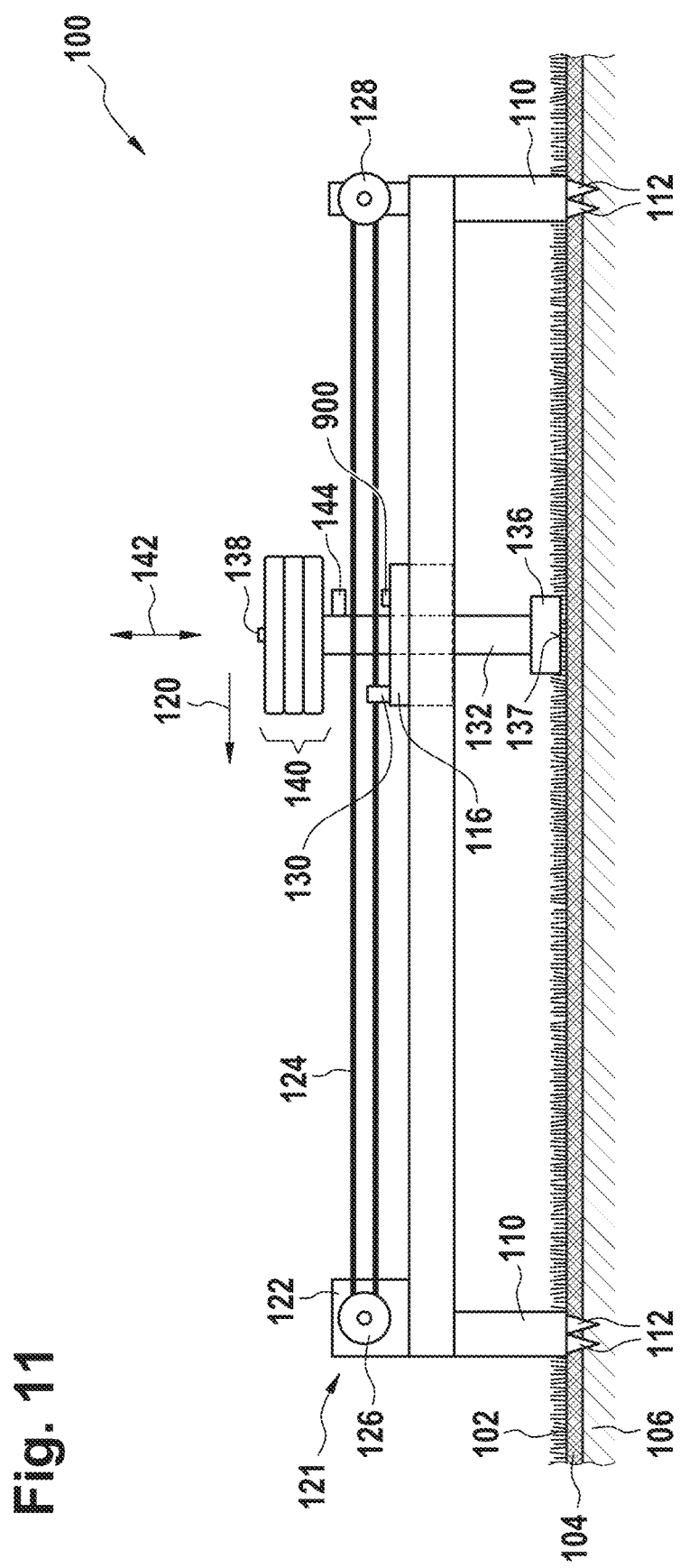
FIG. 11 shows a further view of the synthetic turf testing apparatus of FIG. 8.

FIG. 11 shows the same synthetic turf testing apparatus 100 that is illustrated in FIGS. 9 and 10. In FIG. 11 the pedestal 132 and the test element 136 have completed their freefall and are shown at the instant of impact with the synthetic turf 102. The carriage 116 still has a velocity in the direction 120. The carriage 116 is shown as having moved a bit closer to the left hand side of the apparatus 100. If a force sensor is incorporated into the test element 136 or the pedestal 132 then the impulse as the test element 136 impacts the synthetic turf 102 can be measured. The actuator 121 can be controlled in several different ways. In some examples the actuator 121 is controllable such that the carriage 116 is moved according to a particular velocity or position profile. In other cases the actuator 121 can be configured such that the carriage 116 is allowed to come to a stop due to friction of the contact surface 137 with the synthetic turf carpet 102.

Figure 12:
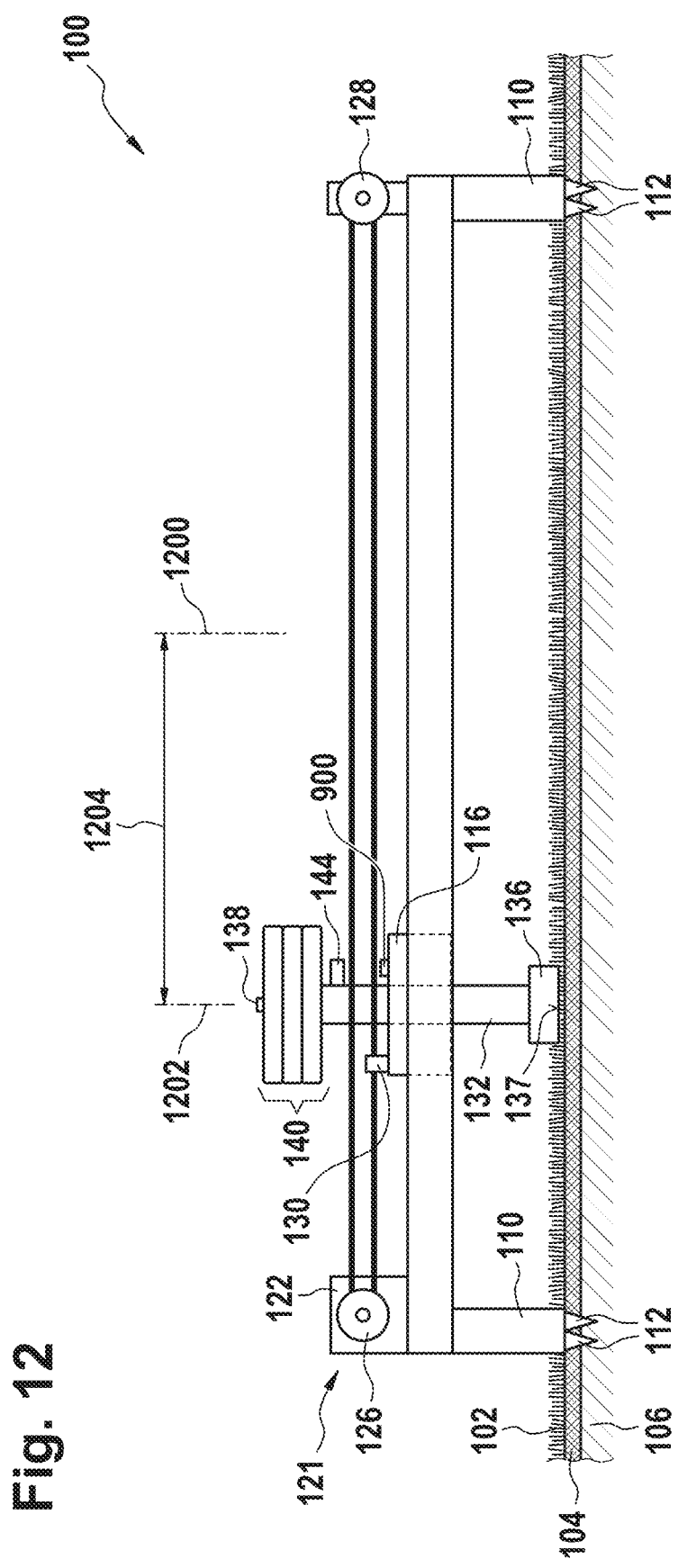
FIG. 12 shows a further view of the synthetic turf testing apparatus of FIG. 8.

FIG. 12 further illustrates the synthetic turf testing apparatus 100 illustrated in FIGS. 9-11. In this example the carriage 116 was allowed to move freely after the contact surface 137 impacted the synthetic turf 102. The line 1200 indicates the position of the pedestal 132 when the contact surface 137 impacted the synthetic turf 102. The contact surface 137 then dissipated energy by friction until the pedestal 132 halted at the position of the line indicated by 1202. The line with two arrows 1204 indicates the distance travelled 1204 by the pedestal 132 and the carriage 116 after the impact. In some examples the actuator 121 may be configured for measuring the distance 1204. In other examples there may be optical or other sensors which enable the measurement of the distance 1204 also.

Figure 13:
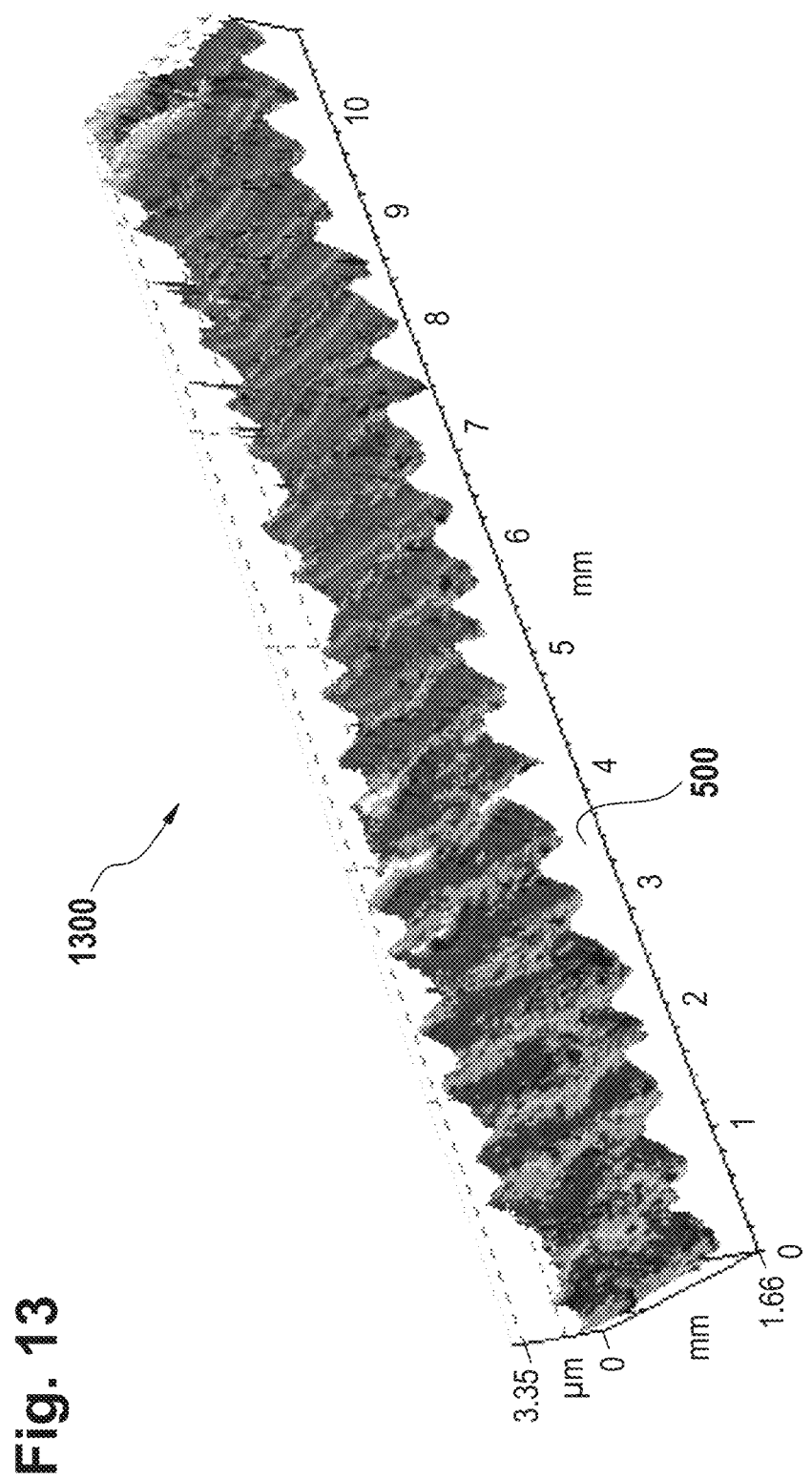
FIG. 13 illustrates an example of a post-abrasion three-dimensional image.

FIG. 13 shows an example of a post-abrasion three-dimensional image 1300. The image shown in FIG. 13 was acquired using a three-dimensional camera as a direct measurement of how an abrasion test surface was abraded after being used in an synthetic turf testing apparatus such as is illustrated in any one of FIGS. 1, 2, 6, and 9-12. Various statistics may be applied to measure or quantify the average roughness as well as indications of the maximum roughness measured.

LIST OF REFERENCE NUMERALS 100 synthetic turf testing apparatus
102 synthetic turf carpet
104 base material
106 ground
108 frame
110 legs
112 protrusions
114 parallel rods (guide structure)
116 carriage
118 linear bearings
120 translational path
121 actuator
122 motor
124 belt
126 driving pulley
128 driven pulley
130 attachment point
132 pedestal
134 linear bearing
136 test element
137 contact surface
138 weight holder
140 weight plate
142 movement axis or vertical direction
144 instrument electronics
300 place the synthetic turf testing apparatus such that the contact surface is in con-tact with synthetic turf along the translational path
302 control the actuator to move the carriage along the translational path
304 repeatedly record the time dependent temperature as the carriage moves along the translational path
400 polytetrafluorethylene block
402 flat surface
404 curved edges
406 temperature sensor
500 abrasion test surface
502 fastener
600 handheld telecommunications device
602 wireless control element
700 touch screen
702 processor
704 wireless communication system
706 memory
708 battery
710 machine executable instructions
712 test parameters
714 time dependent temperature data
716 temperature statistics
718 thermal dose
720 metadata
722 private key
724 test report
726 signature
728 test database
800 force sensor
900 controllable restraint
902 distance above synthetic turf
1200 impact position
1202 halt position
1204 distance traveled after impact
1300 post abrasion three-dimensional image

The invention claimed is:

1. A synthetic turf testing apparatus comprising:
a test element, wherein the test element has a contact surface for contacting a synthetic turf surface, wherein the test element comprises a temperature sensor for measuring a time dependent surface temperature of the contact surface, wherein the temperature sensor is mounted flush with the contact surface;
a pedestal attached to the test element, wherein the pedestal is configured for applying force to the test element;
a carriage for translating the pedestal along a translational path;
a guide structure for supporting the carriage and guiding the carriage along the translational path; and
an actuator for moving the carriage relative to the guide structure.

2. The synthetic turf testing apparatus of claim 1, wherein the pedestal comprises a weight holder for receiving weights, wherein the pedestal is configured for transmitting force generated by the weights to the contact surface.

3. The synthetic turf testing apparatus of claim 1, wherein the synthetic turf testing apparatus further comprises a controller, wherein the controller is configured for recording the time dependent surface temperature.

4. The synthetic turf testing apparatus of claim 3, wherein the controller is configured for controlling the actuator to perform any one of the following: control the actuator to move the carriage according to a predetermined velocity or position profile, control the actuator to accelerate to a predetermined release velocity, allow the carriage to move freely after the predetermined release velocity is achieved, and combinations thereof.

5. The synthetic turf testing apparatus of claim 4, wherein the pedestal is configured for freely moving along a movement axis relative to the carriage, wherein the carriage further comprises a controllable restraint configured for releasably fixing the pedestal relative to the carriage such that the test element is suspended above the synthetic turf surface, wherein the controller is configured for controlling the controllable restraint to release the pedestal according to any one of the following criteria: when the carriage is in a predetermined location, at a predetermined time, and when the carriage reaches a predetermined drop velocity.

6. The synthetic turf testing apparatus of claim 5, wherein the pedestal further comprises a force sensor for measuring an impulse after the controllable restraint is released.

7. The synthetic turf testing apparatus of claim 3, wherein the controller comprises a hand held telecommunications device.

8. The synthetic turf testing apparatus of claim 3, wherein the controller is configured for calculating any one of the following from the time dependent surface temperature: a maximum temperature, an average temperature, a thermal dose, and combinations thereof.

9. The synthetic turf testing apparatus of claim 3, wherein the controller is configured for receiving a set of test parameters, wherein the controller is further configured for controlling the actuator using the set of test parameters.

10. The synthetic turf testing apparatus of claim 9, wherein the set of test parameters comprise metadata descriptive of synthetic turf conditions.

11. The synthetic turf testing apparatus of claim 3, wherein the controller is configured for generating a test report comprising any one of the following: the time dependent surface temperature, a set of test parameters, metadata, and combinations thereof.

12. The synthetic turf testing apparatus of claim 11, wherein the controller is further configured to generate a cryptographic signature for the test report using a private key of a public-key cryptographic algorithm.

13. The synthetic turf testing apparatus of claim 1, wherein the contact surface is formed by any one of the following: plastic, a polymer, metal, Polytetrafluoroethylene, and combinations thereof.

14. The synthetic turf testing apparatus of claim 1, wherein the actuator is configured for moving the carriage at a peak velocity of at least 1 meter per second.

15. The synthetic turf testing apparatus of claim 1, wherein the temperature sensor is a surface thermocouple.

16. The synthetic turf testing apparatus of claim 1 wherein the contact surface is configured for receiving an abrasion test surface that covers the contact surface.

17. A method of testing synthetic turf with a synthetic turf testing apparatus according to claim 1, wherein the method comprises:

placing the synthetic turf testing apparatus such that the contact surface is able to contact the synthetic turf along the translational path;
controlling the actuator to move the carriage along the translational path;
repeatedly recording the time dependent surface temperature of the contact surface as the carriage moves along the translational path.

18. The method of claim 17, wherein the method further comprises generating a test report using the time dependent surface temperature of the contact surface, wherein the pedestal or the carriage comprises a transmitter, and wherein the method further comprises transmitting the test report to a hand held telecommunications device using the transmitter.

19. The method of claim 17, wherein the method further comprises calculating any one of the following from the time dependent surface temperature: a maximum temperature, an average temperature, a thermal dose, and combinations thereof.

20. The method of claim 17, wherein the pedestal applies weight to the contact surface caused by a mass of at least 30 kg.

21. The method of claim 17, wherein the method further comprises:
attaching an abrasion test surface to the contact surface before placing the synthetic turf testing apparatus in contact with synthetic turf;
acquiring a post-abrasion three-dimensional image of the abrasion test surface with a three-dimensional imaging system after repeatedly recording the time dependent surface temperature of the contact surface as the carriage moves along the translational path; and
calculating surface wear statistics at least partially using the post-abrasion three-dimensional image.

22. The method of claim 21, wherein the method further comprises acquiring an initial three-dimensional image of the abrasion test surface with the three-dimensional imaging system before attaching the abrasion test surface to the contact surface, and wherein the surface wear statistics are calculated using a comparison between the post-abrasion three-dimensional image and the initial three-dimensional image.

* * * * *